United States Patent
Van Phan et al.

(10) Patent No.: US 11,064,520 B2
(45) Date of Patent: Jul. 13, 2021

(54) PUCCH RESOURCE ALLOCATION FOR URLLC SUPPORT

(71) Applicant: Nokia Technologies Oy, Espoo (FI)

(72) Inventors: Vinh Van Phan, Oulu (FI); Ling Yu, Kauniainen (FI); Zexian Li, Espoo (FI); Peter Rost, Heidelberg (DE)

(73) Assignee: Nokia Technologies Oy, Espoo (FI)

( * ) Notice: Subject to any disclaimer, the term of this patent is extended or adjusted under 35 U.S.C. 154(b) by 32 days.

(21) Appl. No.: 16/470,348

(22) PCT Filed: Dec. 11, 2017

(86) PCT No.: PCT/IB2017/057808
§ 371 (c)(1),
(2) Date: Jun. 17, 2019

(87) PCT Pub. No.: WO2018/116051
PCT Pub. Date: Jun. 28, 2018

(65) Prior Publication Data
US 2020/0015270 A1    Jan. 9, 2020

Related U.S. Application Data

(60) Provisional application No. 62/438,566, filed on Dec. 23, 2016.

(51) Int. Cl.
*H04W 74/06* (2009.01)
*H04L 5/00* (2006.01)
(Continued)

(52) U.S. Cl.
CPC .......... *H04W 74/06* (2013.01); *H04L 5/0037* (2013.01); *H04W 72/0413* (2013.01); *H04W 72/14* (2013.01); *H04W 76/11* (2018.02)

(58) Field of Classification Search
CPC . H04W 74/06; H04W 72/14; H04W 72/0413; H04L 5/0037; H04L 5/00
See application file for complete search history.

(56) References Cited

U.S. PATENT DOCUMENTS

2012/0230238 A1*  9/2012  Dalsgaard ............ H04L 1/0027
                                                   370/311
2014/0198773 A1   7/2014  Yin et al.
(Continued)

FOREIGN PATENT DOCUMENTS

WO    2018/028394 A1    2/2018
WO    2018/062976 A1    4/2018
WO    2018/064367 A1    4/2018

OTHER PUBLICATIONS

"3rd Generation Partnership Project; Technical Specification Group Radio Access Network; Study on Scenarios and Requirements for Next Generation Access Technologies; (Release 14)", 3GPP TR 38.913, V14.0.0, Oct. 2016, pp. 1-39.
(Continued)

*Primary Examiner* — Yemane Mesfin
*Assistant Examiner* — Henry Baron
(74) *Attorney, Agent, or Firm* — Harrington & Smith

(57) ABSTRACT

The use of PUCCH resources can be more efficient such as by sharing PUCCH resources between URLLC UEs and non-URLLC UEs in a controllable way enhanced with a smart deterministic downlink polling when needed. A method comprises receiving, by a user equipment from a network node of a communication network, information comprising a given physical uplink control channel resource instance allocated to the user equipment, wherein the physical uplink control channel resource instance is allocated to more than one user equipment including the user equipment; signaling the network node using an allocated physical uplink control channel resource instance in a given sub-
(Continued)

frame; and, receiving polling form the network node, wherein the polling comprises an uplink grant.

20 Claims, 6 Drawing Sheets

(51) Int. Cl.
    *H04W 72/04*     (2009.01)
    *H04W 72/14*     (2009.01)
    *H04W 76/11*     (2018.01)

(56) References Cited

U.S. PATENT DOCUMENTS

2019/0230737 A1\*   7/2019   Fujishiro ............... H04W 76/30
2019/0254058 A1\*   8/2019   Xie ....................... H04L 5/0064

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.0.0, Sep. 2016, pp. 1-314.

"3rd Generation Partnership Project; Technical Specification Group Radio Access Network; Evolved Universal Terrestrial Radio Access (E-UTRA); Physical channels and modulation (Release 14)", 3GPP TS 36.211, V14.0.0, Sep. 2016, pp. 1-170.

"Multiplexing UL URLLC and eMBB", 3GPP TSG-RAN WG1 meeting #86bis, R1-1609056, Agenda: 8.1.6.1, Samsung, Oct. 10-14, 2016, pp. 1-2.

International Search Report and Written Opinion received for corresponding Patent Cooperation Treaty Application No. PCT/IB2017/057808, dated Apr. 24, 2018, 12 pages.

"Frame Structure Design for NR", 3GPP TSG-RAN WG1 meeting #85, R1-164274, Agenda: 7.1.4, ZTE, May 23-27, 2016, 11 pages.

"3rd Generation Partnership Project; Technical Specification Group Radio Access Network; NR; NR and NG-RAN Overall Description; Stage 2 (Release 15)", 3GPP TS 38.300, V1.3.0, Dec. 2017, pp. 1-68.

\* cited by examiner

PUCCH RESOURCE ALLOCATION FOR URLLC SUPPORT

RELATED APPLICATION

This application was originally filed as Patent Cooperation Treaty Application No. PCT/IB2017/057808 filed Dec. 11, 2017 which claims priority benefit to U.S. Provisional Patent Application No. 62/438,566, filed Dec. 23, 2016.

TECHNICAL FIELD

The teachings in accordance with the exemplary embodiments of this invention relate generally to use of PUCCH resources more efficiently, and, more specifically, relate to sharing PUCCH resources between URLLC UEs and non-URLLC UEs in a controllable way enhanced with a smart deterministic DL polling when needed.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
C-RNTI Cell Radio Network Temporary Identifier
CSI channel state information
DC dual connectivity
DL downlink
HARQ hybrid automatic repeat request
LTE long term evolution
MIMO multiple input multiple output
PCell primary cell
PSCell primary Scell
PDCCH physical downlink control channel
PUCCH physical uplink control channel
SCell secondary cell
UE user equipment
URLLC ultra-reliable and low latency communications It has been established that support of ultra-reliable and low latency communications (URLLC) will be one of major innovations for 5G. The example embodiments of the invention relate to 3GPP standardization of URLLC support in Rel'15 and beyond.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In the example embodiments of the invention as described herein a novel method and apparatus is proposed to, when needed, control sharing physical uplink control channel (PUCCH) resources between ultra-reliable and low latency communications (URLLC) user equipment (UEs) and non-URLLC UEs in a way enhanced with a smart deterministic DL polling.

It is noted that any reference to a URLLC UE as used herein can refer to UE (e.g., in a connected state to a serving network) having or being capable of a URLLC service, and any reference to a non-URLLC UE as used herein can refer to UE (e.g., in a connected state to a serving network) not having or not being capable of a URLLC service, i.e., a non-URLLC capable UE.

Further, it is noted that in accordance with a non-limiting example embodiment of the invention, a "URLLC UE" as described herein can be configured to perform both URLLC services and non-URLLC services simultaneously. Thus, in accordance with the embodiments, a URLLC UE as described herein may communicate only URLLC traffic or may communicate both URLLC traffic and non-URLLC traffic.

It is noted that URLLC UE may require fast UL access in order to deliver a URLLC packet with as low latency requirement as 0.5 ms [3GPP TR38.913]. It is foreseeable that in order to allow such a quick UL access for URLLC UE, ultra-frequent UL control channel resources, referred to as PUCCH resources as in LTE, need to be made available for URLLC UE, e.g., to send a scheduling request (SR) to a serving eNB reliably at nearly any point in time.

In LTE, PUCCH resources are allocated to individual user equipment in a dedicated fashion. This method, if applied as such for URLLC support, may cause a severe capacity limitation coupled with an excessive waste of PUCCH resources, especially when considering unpredictable event-based packet transmissions of URLLC. This is because PUCCH resources for URLLC UE need to be dedicatedly allocated to URLLC UE as frequent as per every sub-frame, 1 ms or a fraction of 1 ms, but those PUCCH resources may not be used most of time due to that URLLC UE is considerably inactive in between successive events of packet transmissions.

Figure 1:
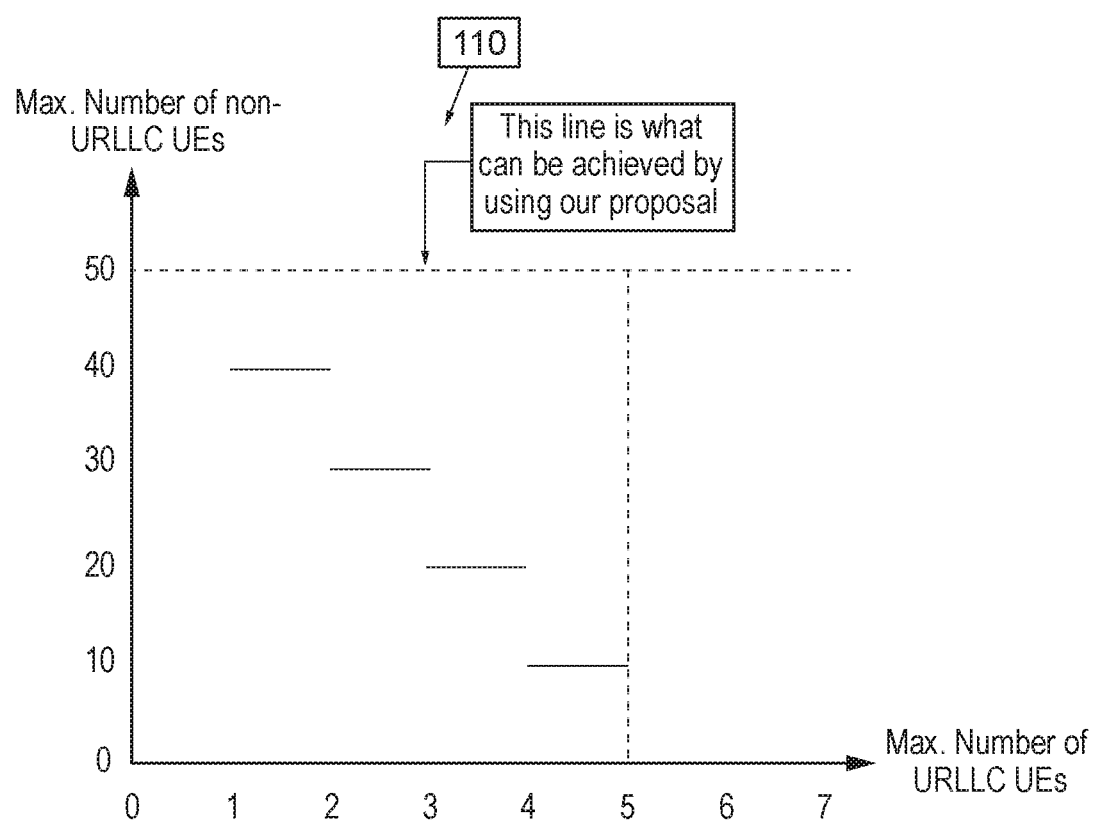
FIG. 1 shows PUCCH capacity limits on the number of non-URLLC UEs vs. the number of URLLC UEs.
Figure 3:
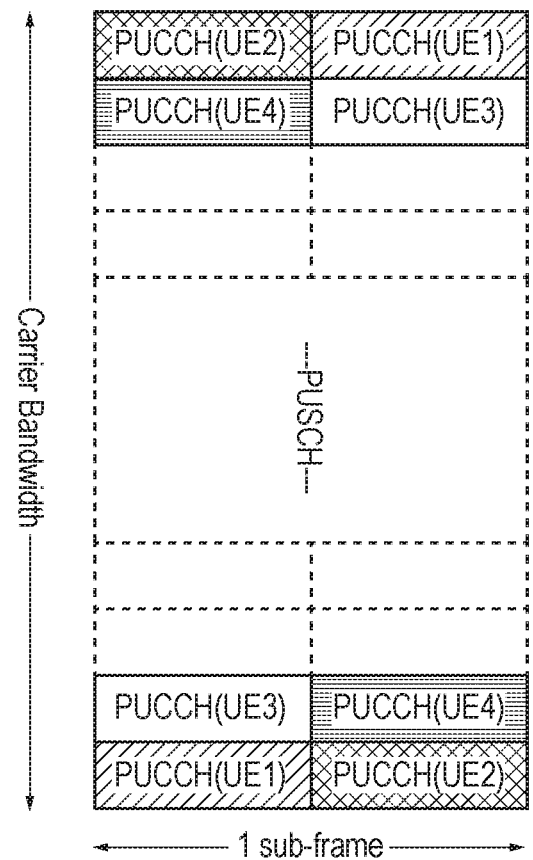
FIG. 3 shows an illustration of PUCCH arrangement and allocation in LTE.

To demonstrate the above statement via a simple numerical example, there is considered a serving cell in which there are 10 instances of PUCCH resources per a sub-frame of 1 ms. PUCCH instances may be arranged: either as in the current LTE, i.e., in pairs of PUCCH instances in 2 consecutive time-slots of 0.5 ms with maximized frequency diversity as shown in FIG. 3 in the prior art section below; or, say, 1 PUCCH instance per 0.1 ms time-slot as for 5G. Provided that for each regular non-URLLC UE a pair of dedicated PUCCH instances is allocated, say, per 10 ms, the PUCCH capacity—100 instances over 10 ms—allows for accommodating a maximum of 50 non-URLLC UEs. For each URLLC UE, to provide high-availability UL access with a latency of less than 1 ms regardless of what kind of data traffic URLLC UE may have, a pair of PUCCH instances per 1 ms is needed. Thus, the PUCCH capacity—10 instances over 1 ms—can only afford to provide for a maximum of 5 URLLC UEs. This means that even while the serving cell may have enough bandwidth to serve a mix of data traffic for up to 50 of non-URLLC UEs and 5 or even more URLLC UEs simultaneously, if there are 5 URLLC UEs being served by the cell and each of URLLC UEs is allocated a pair of dedicated PUCCH instance per 1 ms, then no non-URLLC UE can be admitted due to lack of PUCCH instances for non-URLLC UE. FIG. 1 depicts the capacity limits on the number of non-URLLC UEs vs. the number of URLLC UEs in this numerical example.

The example embodiments of the invention provide a method to at least make use of PUCCH resources more efficiently, considering sharing PUCCH resources between URLLC UEs and non-URLLC UEs in a controllable way enhanced with a smart deterministic DL polling when needed. This allows for maximizing PUCCH capacity for both non-URLLC UEs and URLLC UEs simultaneously and, as the result, the dashed line 110 shown in FIG. 1 can be achieved. Note that deterministic channel access techniques or mechanisms, as opposed to random or contention-based counterparts, are preferred if not necessary for supporting URLLC which is highly time-sensitive with a deterministic end-to-end latency required per data packet. This makes the problem of efficient resource sharing in supporting URLLC much more challenging.

3GPP TR38.913 have captured RAN level requirements for support of URLLC. However, technical solutions and feature details for URLLC supports are very much open, to our knowledge. Further, according to TS 36.300 regarding PUCCH of LTE:

5.2.3 Physical Uplink Control Channel
The PUCCH shall be mapped to a control channel resource in the uplink
Depending on presence or absence of uplink timing synchronization, the uplink physical control signalling for scheduling request can differ.
In the case of time synchronization being present for the pTAG, the outband control signalling consists of:
CSI;
ACK/NAK;
Scheduling Request (SR).
The CSI informs the scheduler about the current channel conditions as seen by the UE. If MIMO transmission is used, the CSI includes necessary MIMO-related feedback.
The HARQ feedback in response to downlink data transmission consists of a single ACK/NAK bit per transport block in case of non-bundling configuration.
PUCCH resources for SR and CSI reporting are assigned and can be revoked through RRC signalling. An SR is not necessarily assigned to UEs acquiring synchronization through the RACH (i.e. synchronised UEs may or may not have a dedicated SR channel). PUCCH resources for SR and CSI are lost when the UE is no longer synchronized.
PUCCH is transmitted on PCell, PUCCH SCell (if such is configured in CA) and on PSCell (in DC).
The physical layer supports simultaneous transmission of PUCCH and PUSCH.
In the present PUCCH consists of 1 resource block (RB) at one end of the UL carrier bandwidth which is followed by another RB in the following slot at opposite end of the UL carrier bandwidth, making use of maximum frequency diversity. PUCCH Control Region comprises every two such RBs. There are, e.g., 1, 2, 4, 8 and 16 PUCCH Control Regions per a sub-frame consisting of 2 slots corresponding to UL carrier bandwidth of 1.25, 2.5, 5, 10 and 20 MHz. As similarly noted above FIG. 3 illustrates an example of PUCCH resource arrangement and allocation in LTE.

Further, it is noted that other contributions propose a contention-based resource sharing scheme with sensing based contention avoidance for URLLC which it seems may not be able to guarantee extreme requirements of URLLC in terms of both reliability and latency.

Example Implementation Overview

As described herein there is at least a method and apparatus for allocating and sharing PUCCH resources between URLLC UEs and non-URLLC UEs coupled with a deterministic DL polling.

Figure 2:
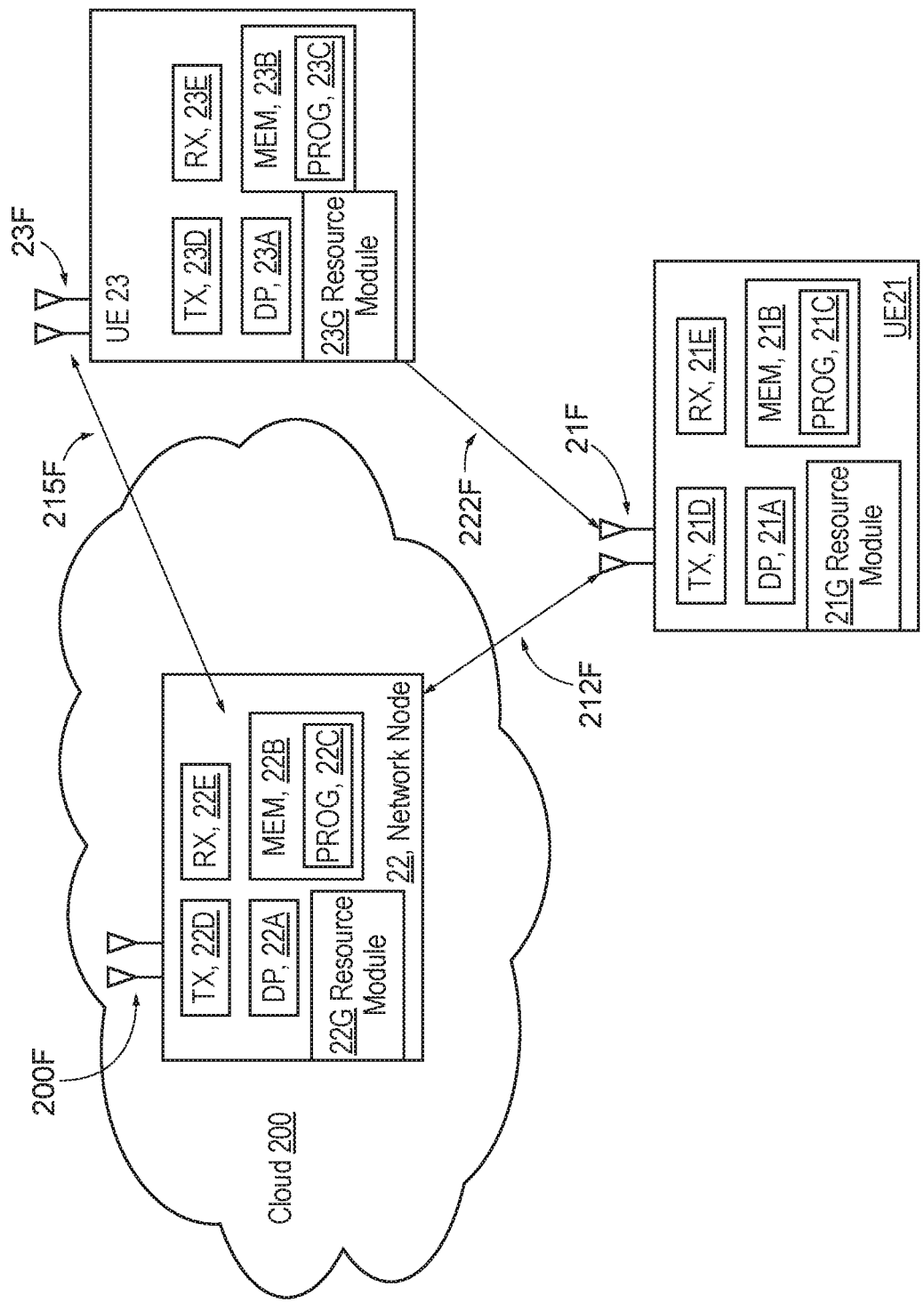
FIG. 2 shows a simplified block diagram of various electronic devices that are suitable for use in practicing the exemplary embodiments of this invention.

Before describing the example embodiments of the invention in details, reference is made to FIG. 2 for illustrating a simplified block diagram of various electronic devices that are suitable for use in practicing the example embodiments of this invention.

The network node 22 of FIG. 2 can be associated with a communication network cloud 200. The network node 22 includes a controller, such as at least one computer or a data processor (DP) 22A, at least one computer-readable memory medium embodied as a memory (MEM) 22B that stores a program of computer instructions (PROG) 22C, and at least one suitable RF transceiver 22D for communication with the UE 21 via antennas 200F to antenna 21F of UE 21 via the data/control path 212F and/or antenna 23F of UE 23 via the data/control path 215F (several when MIMO operation is in use). The network node 22 is coupled via a data/control path 212F to the UE 21. The path 212F may be implemented such as by a wired and/or wireless connection. The network node 22 can also be coupled to another device, such as another network node e.g., another eNB for polling coordination operations as described herein.

The UE 23 includes a controller, such as at least one computer or a data processor (DP) 23A, at least one non-transitory computer-readable memory medium embodied as a memory (MEM) 23B that stores a program of computer instructions (PROG) 23C, and at least one suitable radio frequency (RF) transmitter and receiver pair (transceiver) 23D for bidirectional wireless communications with the UE 21, the network node 22, and/or another device associated with the cloud via an antenna or antennas 23F, and/or a hardwired connection. In addition the UE 23 may be directly or indirectly connected to the UE 21 such as via a connection 222F.

The UE 21 includes a controller, such as at least one computer or a data processor (DP) 21A, at least one non-transitory computer-readable memory medium embodied as a memory (MEM) 21B that stores a program of computer instructions (PROG) 21C, and at least one suitable radio frequency (RF) transmitter and receiver pair (transceiver) 21D for bidirectional wireless communications with the UE 23, the network node 22, and/or another device associated with the cloud via an antenna or antennas 21F, and/or a hardwired connection. As stated above, the UE 23 may be directly or indirectly connected to the UE 21 such as via a connection 222F.

For the purposes of describing the exemplary embodiments of this invention the network node 22, the UE 21, and/or the UE 23 may be assumed to include a resource module 22G, 21G, and 23G, respectively. The resource module 21G, 22G, and/or the 23G are assumed to be configured to operate in accordance with the non-limiting examples of the embodiments of this invention as described herein.

At least one of the programs 21C, 22C, and 23C is assumed to include program instructions that, when executed by the associated data processor, enable the device to operate in accordance with the exemplary embodiments of this invention, as will be discussed below in greater detail. That is, the exemplary embodiments of this invention may be implemented at least in part by computer software executable by the DP 21A, DP 22A, and/or DP 23A, or by hardware, or by a combination of software and hardware (and/or firmware). Likewise, the resource modules 21G, 22G, and 23G may be configured to perform the PUCCH assignment and/or polling operations as described herein. The resource modules 21G, 22G, and 23G may be implemented at least in part by executable computer software, or by hardware, or by a combination of software and hardware (and firmware), e.g., the software and hardware as indicated in FIG. 2.

The various data processors, memories, programs, transceivers and interfaces depicted in FIG. 2 may all be considered to represent various means for performing operations and functions that implement the several non-limiting aspects and embodiments of this invention.

In general, the various embodiments of the UE 21 may include, but are not limited to, a server, cellular mobile devices, personal digital assistants (PDAs) having wireless and/or wired communication capabilities, portable computers having communication capabilities, GPS devices, image capture devices such as digital cameras having communication capabilities, gaming devices having communication capabilities, music storage and playback appliances having communication capabilities, Internet appliances permitting wireless Internet access and browsing, as well as portable units or terminals that incorporate combinations of such functions.

The computer-readable memories 21B, 22B, and 23B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 21A, 22A, and 23A may be of any type suitable to the local technical environment, and may include one or more of general purpose computers, special purpose computers, microprocessors, digital signal processors (DSPs) and processors based on multi-core processor architectures, as non-limiting examples.

Figure 4:
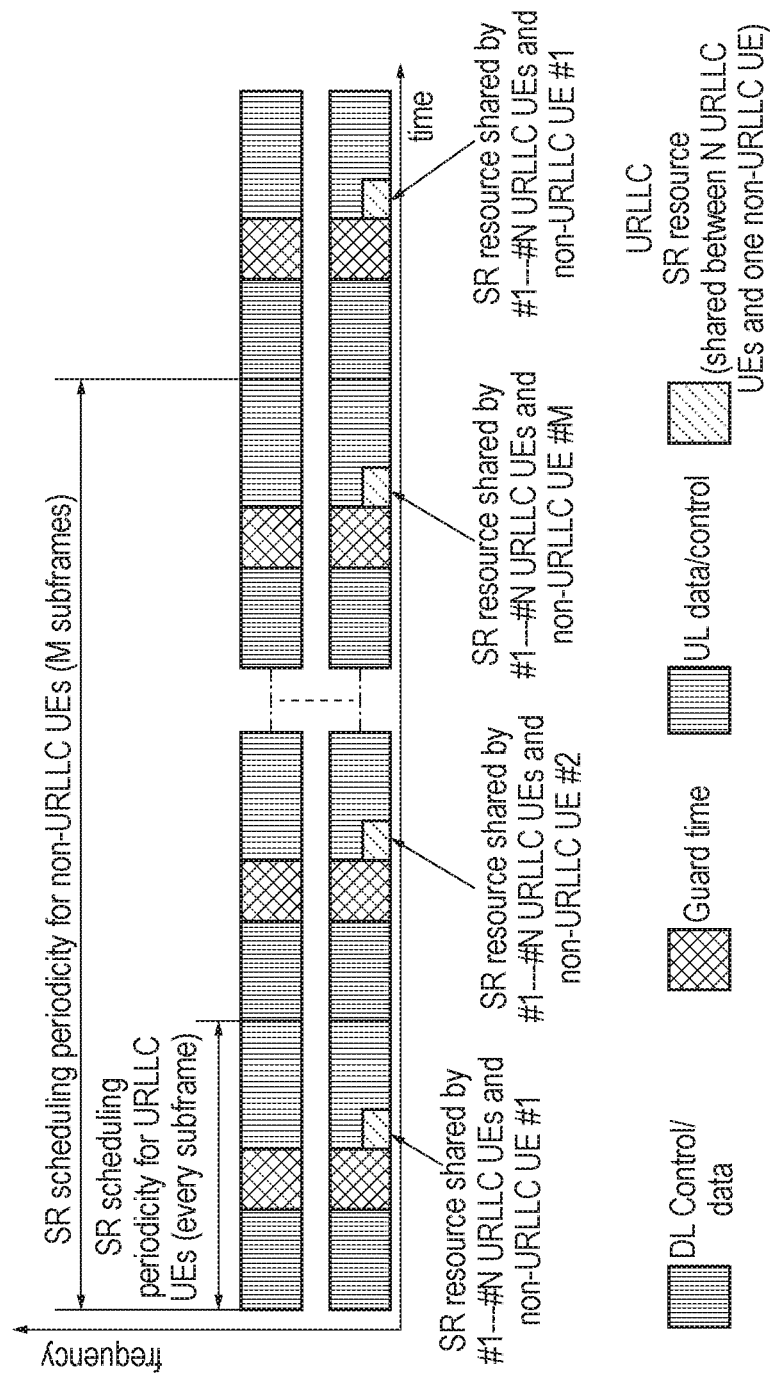
FIG. 4 shows an illustration of the proposed PUCCH sharing between URLLC UEs and non-URLLC UEs.

In accordance with an example embodiment of the invention a given PUCCH instance may be allocated to up to N different pre-determined URLLC UEs and plus 1 non-URLLC UE, as illustrated in FIG. 4, where N is an integer. It is noted that in accordance with a non-limiting example embodiment the N different URLLC UE can be predetermined by a UE such as the UE 21 and/or UE 23 as in FIG. 2; and/or predetermined by a Network Node such as the Network Node 22 as in FIG. 2. Further, this information can be communicated between the UEs and the Network Node. FIG. 4 relates to a system having a single PUCCH resource, referred to as SR resource in FIG. 4, per a sub-frame and each of individual PUCCH instances is shared by N different URLLC UEs and one of M different non-URLLC UEs. In general, N=1 is equivalent to the case of dedicated PUCCH resource allocation among URLLC UEs and in the light of the numerical example depicted in FIG. 1, the dashed line 110 stops at the vertical line of the maximum number of URLLC UEs equal to 5. N>1 means that the dashed line 110 in FIG. 1 may be further extended beyond the PUCCH capacity limit of 5 URLLC UEs, up to 5*N. However, the serving eNB always has deterministic knowledge which particular UEs may transmit on a given PUCCH instance.

The example embodiments of the invention allow for resolving at least two essential issues: (i) ensuring that individual URLLC UEs have sufficient PUCCH allocation per 1 ms so as to be able to get UL access to initiate a SR for sending an event-trigger URLLC packet within a required latency anytime; and (ii) eliminating a need for excessive PUCCH resources while serving a large enough number of URLLC UEs simultaneously without notable impact on serving non-URLLC UEs. Thus, N may be referred to as the PUCCH capacity scaling factor for URLLC support. N can be configured and optimized on the cell basis, also due to the deterministic eNB polling proposed in the following embodiment. For those UEs which are configured to share a certain PUCCH instance, UL control information sent on that PUCCH instance is to be masked by the C-RNTI of corresponding UE or, that is, UE ID should be indicated along with control information on the shared PUCCH instance. The C-RNTI masking may not be needed for non-URLLC UE, as there may be only one non-URLLC on a PUCCH instance.

Example Embodiments Overview

In another example embodiment of the invention may be reception of a given PUCCH instance which is allocated to more than one particular UEs in a way as proposed in the previous embodiment. In accordance with the example embodiments, if the eNB detects the presence of the signal, for example sufficient power of radio signals received, but fails to decode the information sent on the given PUCCH instance then in accordance with the example embodiments the serving eNB may determine to poll for those particular UEs.

In accordance with the example embodiments of the invention there is:

In case the given PUCCH instance is allocated to one particular URLLC UE and one particular non-URLLC UE, the eNB may schedule an UL grant for at least the URLLC UE right away and indicate that to the URLLC UE via, e.g., corresponding PDCCH. It can be implementation specific whether the eNB may schedule an UL grant for non-URLLC UE right away or not. It is noted that for a case of one subframe/TTI the PUCCH allocation can include up to one non-URLLC UE, and for a case different TTIs the PUCCH resource can include multiple non-URLLC UEs.

In case the given PUCCH instance is allocated to more than one particular URLLC UEs, the eNB may poll all of those particular URLLC UEs with individual UL grants allocated right away so that at least the one(s) which actually sent on the given PUCCH instance may get UL access without any further delay. This, however, implies a possible waste of some UL grant in case not all the URLLC UEs actually sent on the given PUCCH instance and therefore might not need an UL grant. Notice that the probability that the eNB needs to poll for more than one URLLC UEs in this case depends on: (i) the probability that the given PUCCH instance needs to be allocated to more than one particular URLLC UEs; and (ii) the probability that more than one of those particular URLLC UEs has a need to send a SR at the same time using the same given PUCCH instance. The factor (i) depends on PUCCH capacity of the serving RAN and the number of URLLC UEs being served. The factor (ii) depends on transmission demands of the individual URLLC UEs that trigger more than one of those particular URLLC UEs to send on the same PUCCH instance. This relates to the probability that more than one of those particular URLLC UEs are activated at the same time slot of a fraction of 1 ms. Thus, the need for the eNB to poll more than one URLLC UEs rarely happens and therefore additional overhead caused by the proposed deterministic polling is negligible. In case the given PUCCH instance is also allocated to a non-URLLC UE, it is optional whether the eNB may schedule an UL grant for the non-URLLC UE right away or not.

Figure 5:
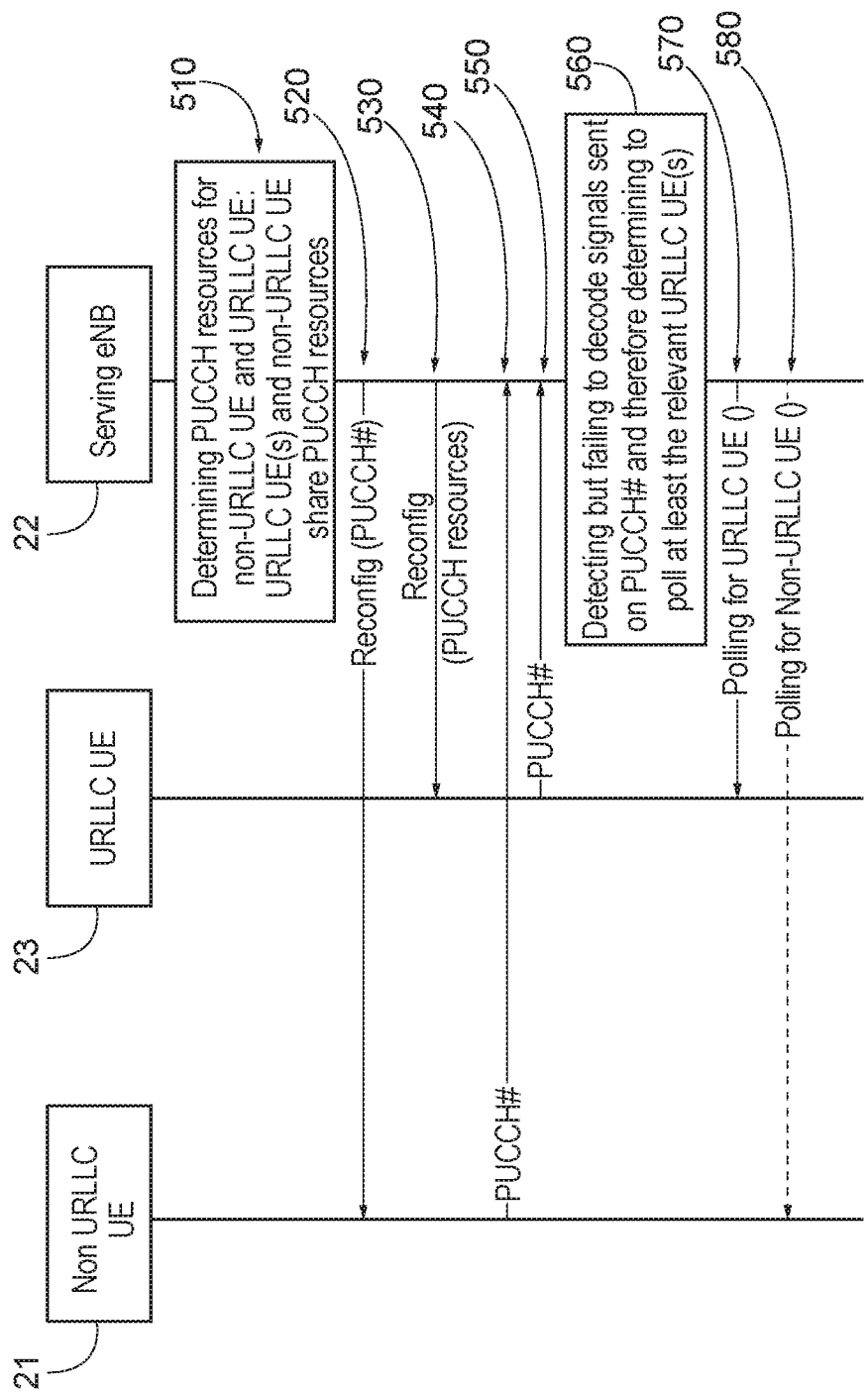
FIG. 5 shows a PUCCH resource allocation with possible eNB polling for an efficient support of URLLC.

FIG. 5 illustrates the proposed PUCCH resource allocation coupled with the deterministic eNB polling for an efficient support of URLLC. Further detailed embodiments are described in the next section. It is noted that the devices of FIG. 5 can be the devices as shown in FIG. 2. In this regard the devices are labeled as non-URLLC UE 21, URLLC UE 23, and serving eNB 22 such as to show a possible, but non-limiting, relation to the devices of FIG. 2. As shown at step 510 of FIG. 5 there is determining PUCCH resources for non-URLLC UE and URLLC UE, where URLLC UE(s) and non-URLLC UE may share PUCCH resources. At step 520 information of the PUCCH resources is sent to the non-URLLC UE 21 and URLLC UE 23 for reconfiguration at the UEs. Then as shown in steps 540 and 550 the non-URLLC UE 21 and URLLC UE 23 signal the serving eNB 22 using the PUCCH resources. At step 560 it is shown that there is detecting but failing to decode signals from the non-URLLC UE 21 and URLLC UE 23 sent on the PUCCH resources. Then as shown in steps 570 and 580 there is polling for the non-URLLC UE 21 and URLLC UE 23 in response to the failed decoding.

In an embodiment of the invention, the eNB polling may be implemented using DL control channel PDCCH, i.e., via regular UL grants addressed to C-RNTIs of individual UEs sent on common PDCCH for instance for all the relevant UEs, regardless of URLLC or non-URLLC.

In another embodiment of the invention, the eNB polling for the non-URLLC UE is via common PDCCH whereas the eNB polling for the relevant URLLC UEs is carried out via a separate common DL control channel or resource dedicated to URLLC UEs exclusively.

In one embodiment, a group based polling alternative may be implemented. In this alternative, group-based polling C-RNTI (or C-RNTIs corresponding to frequency-multiplexed PUCCH instances in the same time slot) may be introduced and used to address the poll and associated UL grant for all the relevant UEs being polled in the same occasion. The relevant UEs are meant for those URLLC UEs which actually sent SRs on the corresponding PUCCH instance and expect to receive individual UL grants, either directly addressed to individual C-RNTIs of the relevant UEs as in the previous embodiments or indirectly to the group-based polling C-RNTI. In the latter, the relevant UEs may derive individual UL grants from the UL grant addressed to the group-based polling C-RNTI.

In another embodiment, the eNB polling for the relevant URLLC UEs may be realized using L2/L3 control signalling. L2/L3 polling message may be received by the relevant URLLC UEs on the resources scheduled for the group-based polling C-RNTI, as in the previous embodiment.

In an embodiment, UE which did not actually send on the given PUCCH instance allocated to it but being polled and get an UL grant may be configured to either ignore the poll or monitor the poll and utilize the UL grant allocated to it for indicating or reporting to the serving eNB certain information, for example, some measurement or status update or SR if it has a need for UL transmission by then. In this regard, it may be beneficial to configure non-URLLC UE to ignore the false poll and URLLC UE to monitor and utilize the false poll.

In one embodiment, as UE may be served in multi-connectivity mode provided by multiple serving cells and eNBs (which may be by default or at least expected for URLLC UE), the eNB polling may be coordinated between the eNBs involved in serving the relevant UEs. This coordination may cause, for examples, the serving eNB which determines to initiate a polling of particular URLLC UEs may notify other neighbouring eNBs (cells within a configured serving cell cluster) of the relevant URLLC UEs to be polled (assuming that those UEs have unique UE IDs over the whole configured serving cell cluster) and the other neighbouring eNBs which are involved in serving the indicated URLLC UEs may also provide UL grants for the indicated URLLC UEs, either directly or via the initiating eNB. In case URLLC UE is configured to send SR in parallel or simultaneously to more than one serving eNBs in multi-connectivity, SR may be received correctly at one serving eNB and not at another serving eNB. In this case, the involved eNBs should coordinate to determine whether polling of a particular URLLC UE is needed or not.

It is noted that for UE being served in multi-connectivity, PUCCH resources may be pooled from individual cells providing multi-connectivity for UE. Hence, the allocation of PUCCH resources for URLLC UE may take advantage of the PUCCH resource pool for ensuring ultra-frequent PUCCH occasions can be redistributed and assigned for individual URLLC UE while minimizing the need to share a PUCCH instance between more than 1 URLLC UEs so as to minimize the polling overhead. Further, it is noted that the proposed deterministic polling herein may be incorporated with sharing other than PUCCH resources, as long as the shared resources and UEs are configured in a deterministic and scalable fashion. This is preferred for efficient support of demanding URLLC.

Figure 6A:
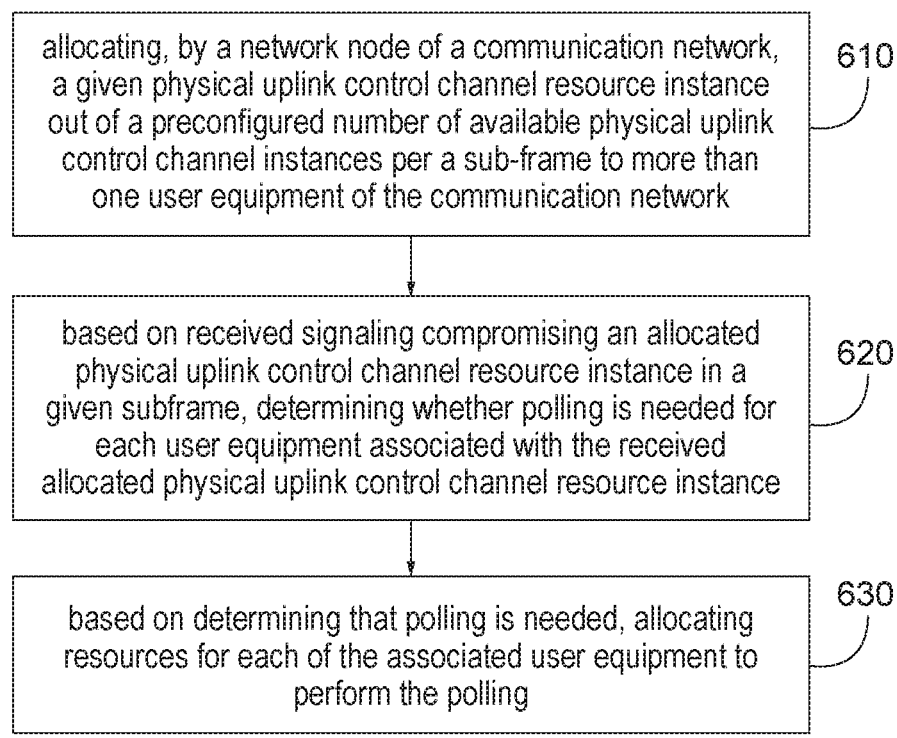
FIGS. 6a and 6b each show a method in accordance with example embodiments of the invention which may be performed by an apparatus.

FIG. 6a illustrates operations which may be performed by a network device such as, but not limited to, a network node 22 as in FIG. 2 or an eNB. As shown in step 610 there is allocating, by a network node of a communication network, a given physical uplink control channel resource instance out of a preconfigured number of available physical uplink control channel instances per a sub-frame to more than one user equipment of the communication network. As shown in step 620 there is based on received signaling comprising an allocated physical uplink control channel resource instance in a given subframe, determining whether polling is needed for each user equipment associated with the received allocated physical uplink control channel resource. Then as shown in step 630 there is based on determining that polling is needed, allocating resources for each of the associated user equipment to perform the polling.

In accordance with the example embodiments as described in the paragraph above, there is, the signaling is unable to be decoded at the network node, and the polling is in response to the signaling being unable to be decoded.

In accordance with the example embodiments as described in the paragraphs above, the polling comprises an uplink grant.

In accordance with the example embodiments as described in the paragraphs above, the uplink grant is addressed to an identifier of each of said more than one user equipment. The identifier, for example, can be C-RNTI, and/or can be used to identify the UE by a network node.

In accordance with the example embodiments as described in the paragraphs above, the more than one user equipment comprises ultra-reliable and low latency communications (URLLC) user equipment, and the physical uplink control channel resource is allocated to up to a preconfigured number of different pre-determined URLLC user equipment, and allocated to up to one non-URLLC user equipment.

In accordance with the example embodiments as described in the paragraphs above, the preconfigured number of pre-determined URLLC user equipment is based on at least a physical uplink control channel scaling factor for URLLC user equipment associated with the communication network.

In accordance with the example embodiments as described in the paragraphs above, the polling comprises group-based polling of the more than one user equipment.

In accordance with the example embodiments as described in the paragraphs above, the group-based polling is addressed to cell radio network temporary identifiers of each of the more than one user equipment, or to a group-based cell radio network temporary identifier associated with the more than one user equipment.

In accordance with the example embodiments as described in the paragraphs above, the polling is allocated via a downlink control channel common to all user equipment, or a downlink control channel specific to ultra-reliable and low latency communications user equipment, or a channel resource dedicated to the ultra-reliable and low latency communications user equipment.

In accordance with the example embodiments as described in the paragraphs above, there is, for a case the associated user equipment is in a multi-connectivity mode with access nodes of more than one cell of the communication network, coordinating the polling with the access nodes of the more than one cell of the communication network.

In accordance with the example embodiments as described in the paragraphs above, the coordinating comprises at least one of notification, by the network node, to the access nodes of the at least one of the user equipment to be polled; and reception of an uplink grant from an access node to include with the polling.

A non-transitory computer-readable medium (MEM 22B of FIG. 2) storing program code (PROG 22C of FIG. 2), the program code executed by at least one processor (DP 22A and/or DP 22G of FIG. 2) to perform the operations as at least described in the paragraphs above.

Figure 6B:
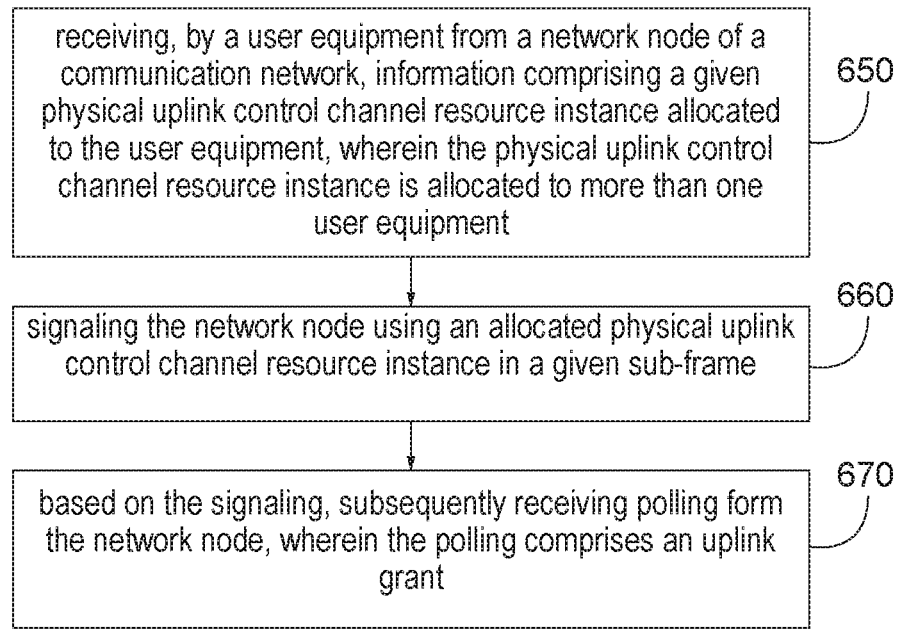

In accordance with the example embodiments of the invention there is means for allocating (RX 22E, TX 22D, PROG 22C, and/or DP 22A and/or RM 22G of FIG. 2), by a network node of a communication network (network node 22 as in FIG. 2), a given physical uplink control channel resource out of a preconfigured number of available physical uplink control channel instances per a sub-frame to more than one user equipment (UE 21 and/or UE 23) of the communication network; based on received signaling comprising an allocated physical uplink control channel resource instance in a given subframe, determining (PROG 22C, and/or DP 22A and/or RM 22G of FIG. 2) that polling is needed for each user equipment associated with the received allocated physical uplink control channel resource instance; and based on the determining, allocating (RX 22E, TX 22D, PROG 22C, and/or DP 22A and/or RM 22G of FIG. 2) resources for each of the associated user equipment to perform the polling. The polling FIG. 6b illustrates operations which may be performed by a user equipment such as, but not limited to, UE 21 and/or UE 23 as in FIG. 2. As shown in step 650 of FIG. 2 there is receiving, by a user equipment from a network node of a communication network, information comprising a given physical uplink control channel resource instance allocated to the user equipment, wherein the physical uplink control channel resource instance is allocated to more than one user equipment. As shown in step 660 there is signaling the network node using an allocated physical uplink control channel resource instance in a given sub-frame. Then as shown in step 670 there is, based on the signaling, subsequently receiving polling form the network node, wherein the polling comprises an uplink grant.

In accordance with the example embodiments as described in the paragraphs above, the polling is received in response to the signaling being unable to be decoded.

In accordance with the example embodiments as described in the paragraphs above, the polling comprises an uplink grant.

In accordance with the example embodiments as described in the paragraphs above, the uplink grant is addressed to an identifier of the user equipment.

In accordance with the example embodiments as described in the paragraphs above, wherein the user equipment is an ultra-reliable and low latency communications (URLLC) user equipment, and the physical uplink control channel resource is allocated to up to a preconfigured number of different pre-determined URLLC user equipment, and allocated to up to one non-URLLC user equipment.

In accordance with the example embodiments as described in the paragraphs above, the preconfigured number of pre-determined URLLC user equipment is based on at least a physical uplink control channel scaling factor for URLLC user equipment associated with the communication network.

In accordance with the example embodiments as described in the paragraphs above, the polling comprises group-based polling of more than one user equipment, wherein the group-based polling is addressed to cell radio network temporary identifiers of each of the more than one user equipment, or to a group-based cell radio network temporary identifier.

In accordance with the example embodiments as described in the paragraphs above, the user equipment is an ultra-reliable and low latency communications user equipment.

In accordance with the example embodiments as described in the paragraphs above, the polling is received via a downlink control channel common to all user equipment, or a downlink control channel specific to ultra-reliable and low latency communications user equipment, or a channel resource dedicated to the ultra-reliable and low latency communications user equipment.

A non-transitory computer-readable medium (MEM 22B of FIG. 2) storing program code (PROG 21C and/or PROG 23C of FIG. 2), the program code executed by at least one processor (DP 21A, DP 23A, RM 22G, and/or RM 23G of FIG. 2) to perform the operations as at least described in the paragraphs above.

In accordance with the example embodiments of the invention there is means for receiving (RX 21E, RX23E, TX 21D, TX 22D, PROG 21C, and/or PROG 23C of FIG. 2), by a user equipment (UE 21 and/or UE 23 as in FIG. 2) from a network node (Network Node 22 as in FIG. 2) of a communication network, information comprising a given physical uplink control channel resource instance allocated to the user equipment, wherein the physical uplink control channel resource instance is allocated to more than one user equipment; means for signaling (RX 21E, RX23E, TX 21D, TX 22D, PROG 21C, and/or PROG 23C of FIG. 2) the network node using an allocated physical uplink control channel resource instance in a given sub-frame; and means, based on the signaling, for subsequently receiving polling form the network node, wherein the polling comprises an uplink grant.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus comprising:
    at least one processor and at least one memory and computer program code;
    the at least one memory and the computer program code can be configured to, with the at least one processor, cause the apparatus at least to
    receive, from a network node of a communication network, information comprising a given physical uplink control channel resource instance allocated to the apparatus, wherein the physical uplink control channel resource instance is allocated to more than one user equipment including the apparatus;
    signal the network node using the allocated physical uplink control channel resource instance in a given sub-frame; and
    receive polling from the network node, wherein the polling comprises an uplink grant and the polling comprises group-based polling of the more than one user equipment.

2. The apparatus of claim 1, wherein the polling is received in response to the signaling being unable to be decoded.

3. The apparatus of claim 1, wherein the uplink grant is addressed to an identifier of the apparatus.

4. The apparatus of claim 1, wherein the more than one user equipment comprises at least one ultra-reliable and low latency communications (URLLC) user equipment and at least one non-URLLC user equipment, and wherein the apparatus is an ultra-reliable and low latency communications (URLLC) user equipment, and wherein the physical uplink control channel resource instance is allocated to up to a pre-configured number of pre-determined URLLC user equipment.

5. The apparatus of claim 4, wherein the physical uplink control channel resource instance is allocated to at least one non-URLLC user equipment.

6. The apparatus of claim 4, wherein the pre-configured number of pre-determined URLLC user equipment is based on at least a physical uplink control channel scaling factor for URLLC user equipment associated with the communication network.

7. The apparatus of claim 1, wherein the group-based polling is addressed to cell radio network temporary identifiers of each of the more than one user equipment, or to a group-based cell radio network temporary identifier.

8. The apparatus of claim 1, wherein the apparatus is an ultra-reliable and low latency communications user equipment.

9. The apparatus of claim 1, wherein the polling is allocated via a downlink control channel common to all of the more than one user equipment, or a downlink control channel specific to ultra-reliable and low latency communications user equipment, or a channel resource dedicated to the ultra-reliable and low latency communications user equipment.

10. An apparatus comprising:
    at least one processor and at least one memory and computer program code;
    the at least one memory and the computer program code can be configured to, with the at least one processor, cause the apparatus at least to allocate, by the apparatus of a communication network, a given physical uplink control channel resource instance out of a preconfigured number of available physical uplink control channel resource instances per a subframe to more than one user equipment of the communication network;

based on received signaling comprising an allocated physical uplink control channel resource instance in a given subframe, determine whether polling is needed for each user equipment associated with the received allocated physical uplink control channel resource instance; and based on the determining that polling is needed, allocate resources for each of the associated user equipment to perform the polling, wherein the polling comprises group-based polling of the more than one user equipment, wherein the polling comprises group-based polling of the more than one user equipment.

11. The apparatus of claim 10, wherein the signaling is unable to be decoded at the apparatus, and wherein the polling is in response to the signaling being unable to be decoded.

12. The apparatus of claim 10, wherein the polling comprises an uplink grant.

13. The apparatus of claim 12, wherein the uplink grant is addressed to an identifier of each of said more than one user equipment.

14. The apparatus of claim 10, wherein the more than one user equipment comprises at least one ultra-reliable and low latency communications (URLLC) user equipment, and wherein the physical uplink control channel resource instance is allocated to up to a preconfigured number of pre-determined URLLC user equipment.

15. The apparatus of claim 14, wherein the physical uplink control channel resource instance is allocated to at least one non-URLLC user equipment.

16. The apparatus of claim 14, wherein the preconfigured number of pre-determined URLLC user equipment is based on at least a physical uplink control channel scaling factor for URLLC user equipment associated with the communication network.

17. The apparatus of claim 10, wherein the group-based polling is addressed to cell radio network temporary identifiers of each of the more than one user equipment, or to a group-based cell radio network temporary identifier associated with the more than one user equipment.

18. The apparatus of claim 10, wherein the polling is allocated via a downlink control channel common to all of the more than one user equipment, or a downlink control channel specific to ultra-reliable and low latency communications user equipment, or a channel resource dedicated to the ultra-reliable and low latency communications user equipment.

19. The apparatus of claim 10, wherein for a case the associated user equipment is in a multi-connectivity mode with access nodes of more than one cell of the communication network, the method further comprises coordinating the polling with the access nodes of the more than one cell of the communication network.

20. A method of communication comprising:
receiving, by a user equipment from a network node of a communication network, information comprising a given physical uplink control channel resource instance allocated to the user equipment, wherein the physical uplink control channel resource instance is allocated to more than one user equipment including the user equipment;

signaling the network node using the allocated physical uplink control channel resource instance in a given sub-frame; and receiving polling from the network node, wherein the polling comprises an uplink grant and the polling comprises group-based polling of the more than one user equipment and the polling comprises group-based polling of the more than one user equipment.

* * * * *